(12) United States Patent
Cantrell et al.

(10) Patent No.: US 6,983,323 B2
(45) Date of Patent: Jan. 3, 2006

(54) MULTI-LEVEL PACKET SCREENING WITH DYNAMICALLY SELECTED FILTERING CRITERIA

(75) Inventors: Craig Cantrell, Austin, TX (US); Marc Willebeek-LeMair, Austin, TX (US); Dennis Cox, Austin, TX (US); Donovan Kolbly, Austin, TX (US); Brian Smith, Fort Worth, TX (US)

(73) Assignee: TippingPoint Technologies, Inc., Austin, TX (US)

( * ) Notice: Subject to any disclaimer, the term of this patent is extended or adjusted under 35 U.S.C. 154(b) by 0 days.

(21) Appl. No.: 10/217,862

(22) Filed: Aug. 12, 2002

(65) Prior Publication Data
US 2004/0030776 A1 Feb. 12, 2004

(51) Int. Cl.
*G06F 13/00* (2006.01)
(52) U.S. Cl. .................. 709/225; 709/238; 709/250; 713/154
(58) Field of Classification Search ............. 709/206, 709/207, 217, 219, 220, 223, 224, 225, 238, 709/250, 226; 718/105; 713/153, 154
See application file for complete search history.

(56) References Cited

U.S. PATENT DOCUMENTS

| | | | | |
|---|---|---|---|---|
| 5,848,233 A | * | 12/1998 | Radia et al. | 713/201 |
| 5,898,830 A | * | 4/1999 | Wesinger et al. | 713/201 |
| 6,072,942 A | * | 6/2000 | Stockwell et al. | 709/206 |
| 6,154,775 A | * | 11/2000 | Coss et al. | 709/225 |
| 6,230,271 B1 | * | 5/2001 | Wadlow et al. | 713/201 |
| 6,243,815 B1 | * | 6/2001 | Antur et al. | 713/201 |
| 6,272,136 B1 | * | 8/2001 | Lin et al. | 370/392 |
| 6,434,618 B1 | * | 8/2002 | Cohen et al. | 709/228 |
| 6,539,394 B1 | * | 3/2003 | Calvignac et al. | 707/102 |
| 6,546,423 B1 | * | 4/2003 | Dutta et al. | 709/225 |
| 6,691,168 B1 | * | 2/2004 | Bal et al. | 709/238 |
| 6,728,885 B1 | * | 4/2004 | Taylor et al. | 713/201 |
| 6,772,348 B1 | * | 8/2004 | Ye | 713/201 |

* cited by examiner

*Primary Examiner*—Viet D. Vu
(74) *Attorney, Agent, or Firm*—Jenkens & Gilchrist, PC

(57) ABSTRACT

A packet filtering operation implements a hierarchical technique. Received packet traffic is first filtered with a first filtering criteria. This first filtering action generates a first pass traffic portion and a fail traffic portion from the received packet traffic. The fail traffic portion is then second filtered with a second filtering criteria. This second filtering action generates a second pass traffic portion and a reject traffic portion. The first filtering criteria provide for higher throughput, lower accuracy processing while the second filtering criteria provide for lower throughput, higher accuracy processing. Dynamic adjustments may be made to the first and second filtering criteria to achieve better overall packet filtering performance. For example, load is measured and the filtering criteria adjusted to better balance load between the hierarchical filtering actions.

75 Claims, 2 Drawing Sheets

MULTI-LEVEL PACKET SCREENING WITH DYNAMICALLY SELECTED FILTERING CRITERIA

BACKGROUND OF THE INVENTION

1. Technical Field of the Invention

The present invention relates to the screening of packet traffic at multiple levels and, in particular, to a hierarchical screening technique where the filter screen criteria at each level may be dynamically selected based on, for example, processing capabilities at each level and/or variations in packet traffic mix.

2. Description of Related Art

The need to screen packet traffic arises in a number of recognized scenarios. One such scenario is in the context of a network intrusion detection system (IDS) application where passing packet traffic is examined for threatening or dangerous content. When such a threat is detected, the suspect packet traffic is identified and captured or dropped (perhaps using a firewall) before it has a chance to enter a protected network.

It is known that the screening operation performed to examine the packet traffic takes time and thus can delay packet traffic transport throughput. This delay concern is magnified as the volume of traffic to be examined increases and the intrusion detection system presents a potential bottleneck to packet traffic passage. Further delays in throughput time result from the use of more comprehensive (and time consuming) screening operations.

A need accordingly exists for a more efficient approach to packet screening.

SUMMARY OF THE INVENTION

In accordance with one aspect of the present invention, packet filtering is performed by first filtering packet traffic with a first filtering criteria to generate a first pass traffic portion and a fail traffic portion. The fail traffic portion is then second filtered with a second filtering criteria to generate a second pass traffic portion and a reject traffic portion.

In a particular embodiment, the first filtering detects suspicious packet traffic for output as the fail traffic portion and the second filtering detects threatening packet traffic within the suspicious packet traffic for output as the reject traffic portion. In a related embodiment, the first filtering triggers a suspicion of dangerous packets within the packet traffic and produces suspicious packets as the fail traffic portion, while the second filtering confirms the presence of dangerous packet traffic within the fail traffic portion and selects dangerous packets as the reject traffic portion.

In a further embodiment, load is measured, with the first and second filtering criteria being dynamically selected and altered based on measured load. Changes to the selected first and second filtering criteria are based on changes in measured load. In a particular implementation, the measurement of load detects an imbalance in load between the first and second filtering operations. The dynamic selection then operates to alter the first and second filtering criteria to better balance filtering load.

In another embodiment, the first set of filtering criteria are characterized by being higher throughput, lower accuracy filtering criteria, and the second set of filtering criteria are characterized by being lower throughput, higher accuracy filtering criteria. The operation for dynamic selection adjusts the relative throughputs and accuracies of the first and second filtering criteria.

In a related embodiment, the adjustment alters a complexity of the first and second filtering criteria to also alter the relative throughputs and accuracies. This is accomplished through a dynamic adaptation process that is responsive to one or more characteristics and/or factors.

In another related embodiment, the adjustment alters a comprehensiveness of the first and second filtering criteria to also alter the relative throughputs and accuracies. Again, this is accomplished through a dynamic adaptation process that is responsive to one or more characteristics and/or factors.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
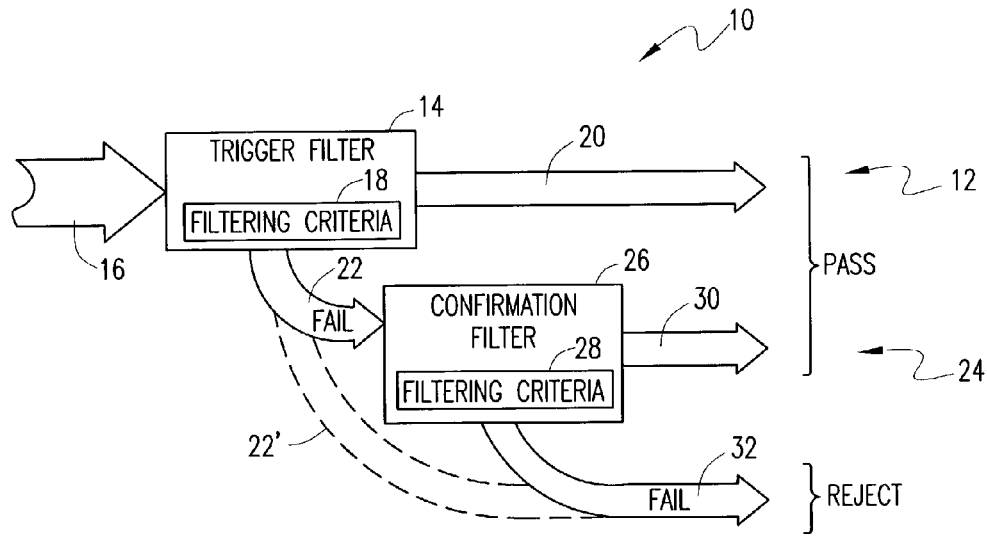
FIG. 1 is a block diagram illustrating a hierarchical approach to packet traffic screening in accordance with an embodiment of the present invention.

Reference is now made to FIG. 1 wherein there is shown a block diagram illustrating a hierarchical approach to packet traffic screening in accordance with an embodiment of the present invention. A screening engine 10 (useful in a number of applications including, for example, network protection, intrusion detection, firewalling, anti-virus content filtering, and the like) implements a multi-level processing technique. In a first level 12 (also referred to as a triggering or detection level), a corresponding first filter 14 receives packet traffic 16 and screens that received traffic against a first set of filtering criteria 18. A portion 20 of the received traffic 16 that passes the first set of filtering criteria 18 is output from the screening engine 10. A portion 22 of the received traffic 16 which does not pass the first set of filtering criteria 18, however, is forwarded on for further examination by a second level 24 of the screening engine 10. The second level 24 (also referred to as a confirmation or catch level) implements a corresponding second filter 26 that receives the failing portion 22 of the packet traffic 16 and screens that received traffic against a second set of filtering criteria 28. A portion 30 of the received traffic (failing portion) 22 passes the second set of filtering criteria 28 and is output from the screening engine 10 to join the packet portion 20 as the pass packet traffic output. A portion 32 of the received traffic (failing portion) 22 which does not pass the second set of filtering criteria 28, however, is then rejected. The rejected packets are then output and acted on as needed (for example, by logging, discarding, alert generation, and the like).

Although two levels of hierarchical processing are illustrated in FIG. 1, it will be understood by those skilled in the art that this is exemplary in nature. The embodiment of the present invention illustrated in FIG. 1 may include three or more levels of processing if desired, with each subsequent and/or additional level being structured in a manner similar to the levels of the first and/or second filters. Generally speaking, with each increase in level comes a more stringent examination of the packets using filtering criteria designed at each incremental level to more accurately detect suspicious or dangerous traffic.

Still further, although FIG. 1 primarily illustrates all traffic that fails the first filtering test (i.e., the failing portion 22) being passed on for second filter processing, it will be understood that, depending on the filtering criteria 18 being applied by the first filter 14, it is likely that the first filter will be able to identify some of the traffic in the portion 22 as definitely being threatening or dangerous. This unambiguously recognized portion 22' of dangerous traffic need not be further processed in the second filter 26 for confirmation and may instead be passed on directly with the rejected portion 32 (as shown by the dotted line) to form the rejected packet output for further handling as needed. An advantage of configuring the engine 10 in such a manner is an increase in throughput with respect to second level 24 processing.

A certain relationship is defined between the screening criteria implemented by the first and second filters 14 and 26, respectively, to provide for improved screening engine 10 throughput performance (speed and accuracy). The first set of filtering criteria 18 are implemented as a triggering mechanism to allow for relatively high speed examination of the received packet traffic 16 where limited processing capability filtering is used with a design to catch substantially all suspicious traffic, understanding that the filter 14 will inevitably erroneously additionally capture some benign traffic (i.e., accuracy is relatively low and there will be a number of false positives) along with the dangerous traffic. As an example, this first level 12 screening implicates header field compares and trigger content searches (i.e., short string compares) that can be performed at higher speed using less complex algorithms and processes with the screened output being more susceptible to including errors. The second set of filtering criteria 28, on the other hand, are implemented as a confirmation mechanism to allow for lower speed examination of the portion 22 of the packet traffic 16 where more complex processing capability filtering is used with a design to more carefully examine the suspicious traffic (identified by the first filter 14) and identify the most likely threatening or dangerous traffic, understanding again that the filter 26 may erroneously capture some benign traffic (i.e., accuracy is relatively high, although there could be a minimal number of false positives), but that the likelihood of this occurring will be significantly smaller than that experienced with the first filter 14. As an example, this second level 24 screening implicates protocol decoders and regular expression matching (i.e., long string compares) at lower speed using more complex algorithms and processes with the screened output being less susceptible to including errors.

It will be understood that by including additional levels (above the second filter) an improvement in the accuracy of the system may be obtained while spreading the processing load out over more filters. However, these benefits are obtained at the expense of additional filtering operations and further possible delays in packet throughput.

The accuracy/throughput relationship between the first set of filtering criteria 18 (for triggering suspicion) and the second set of filtering criteria 28 (for confirming presence) may be better understood using an example. The first set of filtering criteria 18 in an exemplary implementation may include a screen designed to quickly examine passing packets and to cast a broad net for the capture of any traffic that is even remotely suspicious (for example, based on header field compares and short string compares). Because this triggering screen does not necessarily require a detailed or comprehensive examination of each passing packet in the traffic 16, the analysis performed by the first filter 14 may be completed relatively quickly on a packet-by-packet basis thus enabling, with respect to the portion 20 of the received traffic 16 that passes, a relatively high throughput. However, because the screening analysis is not especially detailed or comprehensive, and more specifically because the parameters of the screen are broader and more encompassing in character, the failing portion 22 of the traffic that is caught and passed on for further analysis will likely include a number of packets that are not dangerous (i.e., false positives due to low accuracy). Finding those erroneously captured packets is one of the jobs of the second filter 26. The second set of filtering criteria 28 in an exemplary implementation may include a screen designed to more thoroughly examine the suspicious packet portion 22 and carefully consider the packets (either alone or in combination groups with other preceding packets) for dangerous content (for example, based on protocol decoders and long string compares). Because this confirmation screen implements a more detailed or comprehensive examination of each packet output in the first level screened portion 20, the analysis performed by the second filter 26 could take significantly more time per packet and slows the throughput of these packets. However, due to the first level of screening there are fewer packets that need to be more carefully examined. Additionally, because the screening analysis is more detailed and comprehensive, and more specifically because the parameters of the screen are narrower and more focused to look for certain characteristics in the suspicious traffic, only that traffic that is most likely to be dangerous is caught (i.e, accuracy is high), and the remaining traffic is released delayed only slightly by the time required to confirm the legitimacy of that traffic.

Figure 2:
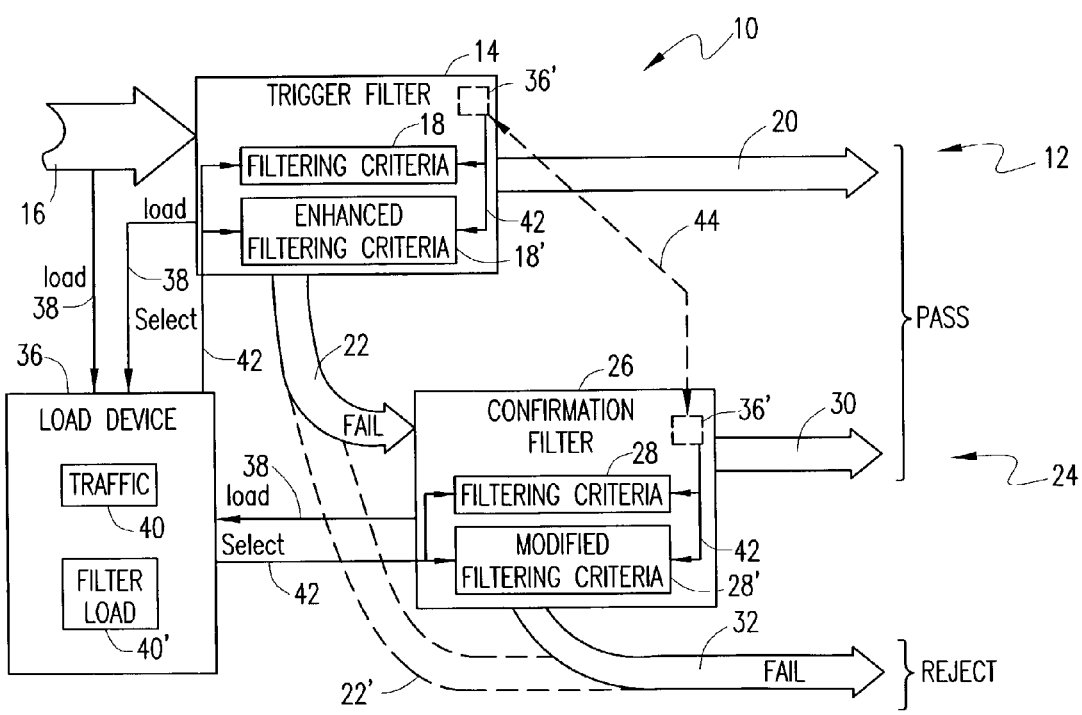
FIG. 2 is a block diagram illustrating a hierarchical approach to packet traffic screening in accordance with another embodiment of the present invention.

Reference is now made to FIG. 2 wherein there is shown a block diagram illustrating a hierarchical approach to packet traffic screening in accordance with another embodiment of the present invention. Like reference numbers refer to similar or identical components. Additionally, although illustrated with only two levels, it will be understood that the embodiment may use three or more levels of filtering as desired.

It is recognized that the volume and nature of the packet traffic 16 (i.e., the traffic mix) tends to vary over time. When the traffic mix is such that screening of the packets do not demand the use of significant processing resources, the first filter 14 is not highly loaded and could be used to perform additional or more comprehensive screenings. Conversely, when the mix of traffic is such that the first filter is highly loaded in making the trigger processing determinations, some of this processing may be off-loaded to the second filter to more efficient share load. The embodiment of FIG. 2 takes advantage of these natural variations in packet traffic mix by adjusting the criteria 18 and 28 used for filtering at each level. These adjustments account for variations in traffic mix and better balance load between the included levels. For example, the engine 10 may change the first set of filtering criteria 18 to perform, at the first filter 14, some of the screening that would otherwise have been performed using the second set of filtering criteria 28 at the second filter 26. Even though this "enhanced" first set of filtering criteria 18' implements a more detailed or comprehensive examination of each packet (i.e., it is, relatively speaking, more accurate), overall throughput may be improved. The enhancement of criteria that are added to form the first set of filtering criteria 18' are not needed in the second set of filtering criteria 28, and thus the second filter 26 may apply a modified second set of filtering criteria 28' that continues to implement a comprehensive, but more narrowly focused, screening than was performed in FIG. 1. A switch back and forth between the criteria 18 and 18*a*' and the criteria 28 and 28*a*' made be implemented as needed in response to detected changes in traffic mix.

The adjustments made to the first and second sets of filtering criteria essentially comprise altering the relative throughputs and accuracies of the filters. For example, a first filter applying a high throughput, low accuracy set of filtering criteria may be adjusted to provide for a somewhat lower throughput with a higher relative accuracy in certain situations. Conversely, a second filter applying a low throughput, high accuracy set of filtering criteria may be adjusted to provide continued accuracy, but less comprehensive, screenings at a lower relative throughput in those situations. These adjustments are made responsive to detected variations in the packet traffic mix and may be used to correct for a perceived imbalance in load between the first and second filters.

Load on the screening engine 10 in general, and its constituent filters in particular, is measured (reference 36) and used to trigger selected changes in the sets of filtering criteria applied by the first and second filters 14 and 26, respectively. Load, in this context refers to any one factor (reference 38), or combination of more than one factor, including, for example, traffic volume, processor loading factors or ratios, detection of excessive amounts of certain traffic types, packet drops, throughput rates, filter criteria, and the like. In the event a given filter is determined to be overloaded, or alternatively in danger of being overloaded, the screening engine responds dynamically to adjust the applied sets of filtering criteria (reference 42; with respect to relative accuracy, throughput, complexity and/or comprehensiveness, for example) so as to better spread or balance the load between the available filters. Several non-limiting examples of such an operation are provided herein to illustrate the load-responsive operation of the engine 10.

The load device 36 of the screening engine 10 may utilize a traffic monitor 40 to measure the volume of certain types of packet traffic 16. From this information, the load device 36 dynamically adjusts the filtering criteria being implemented by each of the first and second filters 14 and 26. For example, if the volume of a certain type of packet traffic 16 measured exceeds a first threshold (indicative of a relatively high traffic level), the load device 36 configures the first and second filters 14 and 26 to implement the first and second sets of filtering criteria 18 and 28, respectively, as discussed above in FIG. 1. In this configuration, the first set of filtering criteria 18 provide a relatively high speed (high throughput) examination of the received packet traffic 16 with limited processing capability filtering being implemented to catch substantially all suspicious traffic (but not necessarily accurately detect dangerous or threatening traffic), while the second set of filtering criteria 28 provide a lower speed (low throughput) examination of the portion 22 of the packet traffic 16 with more complex processing capability filtering being implemented to more carefully examine the suspicious traffic and accurately identify the most likely threatening traffic.

If the volume of the certain type of packet traffic 16 measured later drops below a second threshold (indicative of a relatively low traffic level), the load device 36 configures the first and second filters 14 and 26 to implement the enhanced first and modified second sets of filtering criteria 18' and 28', respectively, as discussed above, by modifying the relative throughput and accuracy characteristics of the filtering criteria. In this configuration, the modified first set of filtering criteria 18' continues to provide for a relatively high speed examination of the received packet traffic 16, however, a slightly more extensive processing capability filtering is implemented to improve accuracy and catch the more (or most) suspicious portion 22 of the traffic 16 (and perhaps generate the portion 22'). The second set of filtering criteria 28', on the other hand, continues to provide a lower speed examination of the portion 22 of the packet traffic 16 with more complex processing capability filtering (perhaps minus that used in the first filter 14 to provide some improvement in throughput) being implemented to more carefully examine the suspicious traffic and identify the most likely threatening traffic.

The relationships between the first and second sets of filtering criteria 18 and 28 and the enhanced first and modified second sets of filtering criteria 18' and 28' may be better understood using an example. Consider for this example a spectrum of available filtering criteria $F(1)$–$F(n)$ relating to detection of a certain threat or danger where, for each piece of criteria F: (a) the complexity of the filtering performed by the criteria increases as n increases; (b) the speed of packet screening performed by the criteria decreases as n increases; and (c) the likelihood of the criteria screening process erroneously catching a packet (i.e., a false positive) decreases as n increases. The first set of filtering criteria 18 may comprise certain filtering criteria $F(1)$–$F(m)$, while the second set of filtering criteria 28 comprise certain filtering criteria $F(m+1)$–$F(n)$. The division of the spectrum at point m by load device 36 reflects a choice made to balance throughput concerns against accuracy in the first filter. Thus, it is recognized that by utilizing filtering criteria $F(1)$–$F(m)$ as the first set of filtering criteria 18, the packets 16 will be quickly processed, by less complex or comprehensive algorithms, but with an increased likelihood of false positives in the portion 22. Alternatively, the enhanced first set of filtering criteria 18' may comprise certain filtering criteria $F(1)$–$F(p)$, while the modified second set of filtering criteria 28' comprise certain filtering criteria $F(p+1)$–$F(n)$, wherein p>m. The division of the spectrum at point p again reflects a choice made by the load device 36 to balance throughput concerns against accuracy at the first filter. However, in this case, because the volume of packet traffic is lower, there is less concern over satisfactorily handling throughput, which allows a more accurate and complex screen to be used by the first filter 14 by including in the enhanced first set of filtering criteria 18' the filtering criteria $F(m)$–$F(p)$ which otherwise would have been implemented by the second set of filtering criteria 28. With the inclusion of criteria $F(m)$–$F(p)$ in the enhanced first set of filtering criteria 18', there is no need for those criteria to again be applied at another level thus allowing for the implementation of the modified second set of filtering criteria 28'. Because the modified second set of filtering criteria 28' is now performing fewer checks on the portion 22, processing speed for each examined packet should increase (with no degradation, however, in accuracy).

The selection of where the division point (m, p, or the like) lies in the spectrum of available filtering criteria $F(1)$–$F(n)$ is made by the load device 36 using, for example, a traffic monitor 40 measured level of packet volume. When the measured volume is relatively high, for example at or above the first threshold, the division point is selected closer to the $F(1)$ end of the spectrum (relatively speaking, higher throughput and lower accuracy). Conversely, when the measured volume is relatively low, for example at or below the second threshold, the division point is selected closer to the F(n) end of the spectrum (relatively speaking, lower throughput and higher accuracy). Generally speaking, the first and second thresholds are different (with first>second) to define a hysteresis of traffic volume change which must be overcome before a switch in the applied sets of filtering criteria is made by the load device 36. This hysteresis prevents the load device 36 from changing the applied sets of filtering criteria in a ping-pong manner responsive to normal and expected fluctuations in measured volume. It is only responsive to a change in measured volume that overcomes the hysteresis that applied sets of filtering criteria are switched.

The traffic monitor 40 may sample the volume of packet traffic with any selected rate desired by the user. Choosing a faster rate allows the engine 10 load device 36 to dynamically respond more quickly to volume changes with corresponding switches in the sets of filtering criteria. A faster rate also allows the load device 36 to consider more data points with each determination. In this way, it will be understood that the measured volume used for making the criteria switching determination may comprise either an instantaneous volume presented by a single data point or an average (or mean) volume presented by a plurality of data points.

Although the foregoing example illustrates the traffic monitor 40 operating in a specific example to measure overall volume, it will be understood that other traffic-related characteristics may additionally or alternatively be measured for purposes of assisting in the load device 36 determination of filtering criteria assignment. For example, the traffic monitor 40 may identify traffic type and measure volume separately for each traffic type. In this context, the engine 10 may have a particular interest in a certain type of traffic, where type may refer to protocol type (HTTP, FTP, DNS, and the like), because filter screening of traffic of that type requires significantly greater amounts of processing resources than other traffic. In the event a significant amount of such traffic were detected, some adjustment may need to be made to the first set of filtering criteria 18 to ensure that the first filter 14 was not overloaded by the presence of that traffic. Still further, the traffic monitor 40 may identify traffic origination and measure volume separately for certain originations or destinations of interest. In this context, the engine 10 may have a particular interest in a certain origin of traffic, where origin may refer to origination address, port ID, protocol destination address, because filter screening of traffic from that origin requires significantly greater amounts of processing resources than other traffic. In the event a significant amount of such traffic were detected, some adjustment may need to be made to the first set of filtering criteria 18 to ensure that the first filter 14 was not overloaded by the presence of that traffic.

As an alternative, the load device 36 may include a filter load monitor 40' that operates to measure the processing load on each of the first filter 14 and the second filter 26. In the event the load monitor 40' discovers that either filter is overloaded in its processing of received packets (for example, when the dropping of packets is detected) or is approaching an overload situation (for example, when processor utilization and/or memory utilization exceed certain thresholds), this indicates that the packet handling loads for the engine 10 are not properly balanced between the first and second filters 14 and 26, respectively. Responsive thereto, the load device 36 may adjust the sets of filtering criteria implemented by the filters (with respect to relative throughput and accuracy, for example) to better balance the load and improve performance. For example, if the load monitor 40' detects that the first filter 14 is overloaded, the sets of filtering criteria implemented by the filters are adjusted so that a less accurate set of filtering criteria (i.e., the division point is selected closer to the F(1) end of the spectrum) is selected for the first filter. This, of course, results in more false positive catches at the first filter and increases the load on the second filter 26 which now must apply a more accurate set of filtering criteria to a large number of packets. However, if the balance point is selected properly the load on the first filter will fall below its overload level and the load on the second filter will not increase above its overload level. Conversely, if the load monitor 40' detects that the second filter 26 is overloaded, the sets of filtering criteria implemented by the filters are adjusted so that a more accurate set of filtering criteria (i.e., the division point is selected closer to the F(n) end of the spectrum) is selected for the first filter 14. This, of course, results in fewer false positive catches with increased load at the first filter 14, but allows the second filter 26 to focus on a more extensive examination without danger of overload.

The load monitor 40' may alternatively operate to measure filter load in comparison to a threshold representing a percentage of load capacity. In the event the measured filter load exceeds the threshold, the load device 36 initiates a load balancing operation. Filter load in this instance may comprise a measure of false positives generated by a given filter level. In the event the load monitor 40' detects from higher level filter (for example, the second filter 26) analysis that a lower level filter (for example, the first filter 14) is generating an excessive number of false positives, the load device 36 may instruct the lower level filter to adjust its set of filtering criteria to increase accuracy. Responsive thereto a more comprehensive set of filtering criteria may be instantiated by the lower level filter. A corresponding change may, or may not, be implemented by the higher level filter to remove redundant filtering criteria.

To prevent filter load measurements from causing ping-pong adjustments in the filtering criteria as load naturally varies over time, an appropriately selected hysteresis may be used to inhibit changes in the same manner as discussed above with respect to traffic volume.

Although the load device 36 and its associated traffic monitor 40 and/or load monitor 40' are illustrated as being functionally separate from the first and second filters, it will be understood that the load balancing-related functionalities may be integrated within the first and second filters (as illustrated by interconnected 44 dotted boxes 36'). For example, as a further alternative, the higher level filter (for example, the second filter 26) may, on its own, be configured to detect that a lower level filter (for example, the first filter 14) is generating an excessive number of false positives. This could be recognized, for example, by comparing the number of packets it receives (i.e., the suspicious packets) to the number of packets it rejects. Responsive thereto, the higher level filter may be overloaded by the processing of too many false positives and issues a request to the lower level filter to instantiate a more comprehensive set of filtering criteria (i.e., criteria that are less likely to capture false positives in the suspicious traffic). The lower level filter, responsive to that request, examines its own loading factor and, if the requested change would not place the lower level filter in danger of overload, implements the new filtering criteria as requested. Conversely, the lower level filter evaluates its own loading factor and, if it is determined to be in danger of overload instantiates a less comprehensive set of filtering criteria that would allow for faster throughput with an increased likelihood of capturing false positives within the identified suspicious traffic. The higher level filter is informed of this change and responds, if necessary, by instantiating a more comprehensive set of filtering criteria to account for the criteria change implemented at the lower level.

Figure 3:
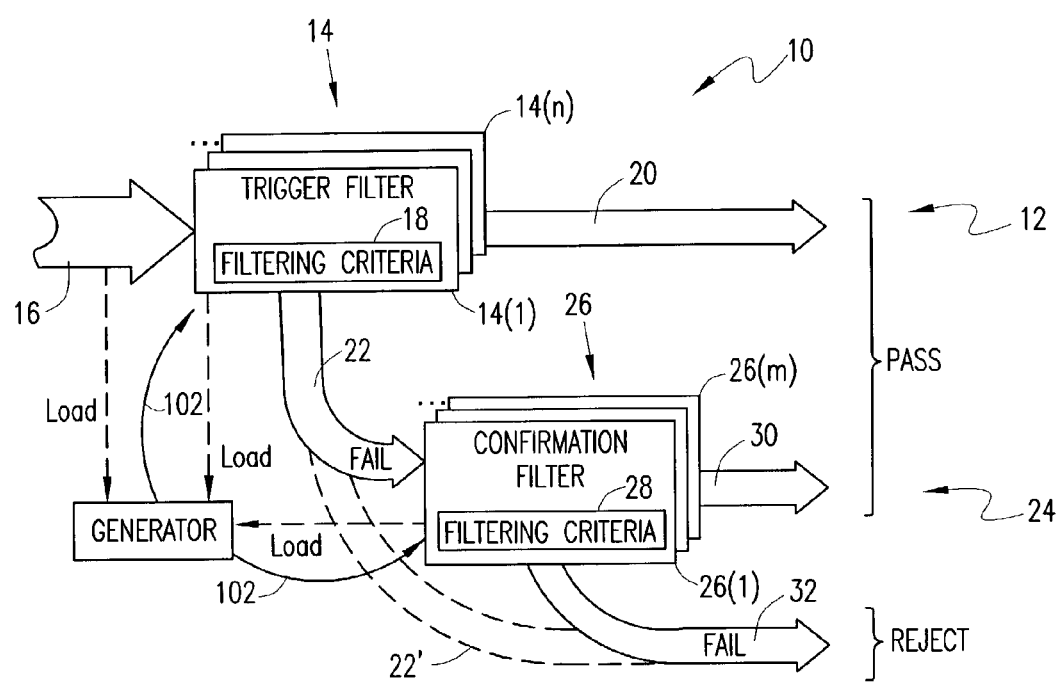
FIG. 3 is a block diagram illustrating a hierarchical approach to packet traffic screening in accordance with yet another embodiment of the present invention.

Reference is now made to FIG. 3 wherein there is shown a block diagram illustrating a hierarchical approach to packet traffic screening in accordance with another embodiment of the present invention. Like reference numbers refer to similar or identical components. Additionally, although illustrated with only two levels, it will be understood that the embodiment may use three or more levels of filtering as desired.

The first filter 14 is implemented through a selected one or more of a plurality of trigger filter modules 14(1)–14(n), where n is not necessarily the same index as recited above for the filter criteria F. Similarly, the second filter 26 is implemented through a selected one or more of a plurality of confirmation filter modules 26(1)–26(m), where m is not necessarily the same index as recited above for the filter criteria F. A generator module 100 operates to select 102 which one (or ones, in combination) of the trigger filter modules 14(1)–14(n) are chosen to operate on the packet traffic 16, as well as which one (or ones, in combination) of the confirmation filter modules 26(1)–26(m) are chosen to operate on the suspicious portion 22 of the traffic 16 produced by the first filter 14.

In this context, the modules 14(n) and 26(m) may represent the existence of corresponding plural sets of criteria 18 and 28, respectively, within the first and second filters 14 and 26 of FIG. 1.

Each one of the plurality of trigger filter modules 14(1)–14(n) and confirmation filter modules 26(1)–26(m) that is available for selection by the generator module 100 is designed to perform a specific screening operation. A processing operation is first designed to detect the presence of a certain threat or danger. This processing operation may be referred to as a detection signature. To address a wide array of threats and dangers posed by the packet traffic, numerous detection signature processing operations may need to be designed. These detection signature processing operations may be unique in some situations to certain threats and dangers. In other situations, one detection signature processing operation may be capable of detecting more than one threat or danger. Nonetheless, once in possession of an arsenal of detection signature processing operations, a determination is next made as to which of the threats or dangers (for which signatures exist) the engine 10 is going to implemented to protect against. Having made that decision, the specific detection signature processing operations for those chosen threats or dangers are evaluated and a determination is made as to which portions of the specific detection signature processing operations are to be implemented at each level of the engine 10. For example, a first detection processing operation may be provided as a first portion represented by filtering criteria 18 that is implemented in one of the trigger filter modules 14(n) and a second portion represented by filtering criteria 28 that is implemented in one of the confirmation filter modules 26(m). Those modules 14(n) and 26(m) are then selected 102 by the generator module 100 to perform screening operations. The process then repeats for a second and further detection processing operation, if necessary, such that plural modules 14(n) and 26(m) are selected to provide the required protection.

The foregoing operation may be better understood through an example. Consider a certain detection signature Sx that is defined by a processing operation for screening packet traffic referred to as a "test" such that:

$$Sx=\text{test}.$$

This signature may be implemented as a single filtering operation using the test. However, when implemented in this fashion, even though the accuracy of the operation would be high (i.e., minimal to no instances of false positives), the test requires substantial processing resources at a single screening level and could significantly delay the passage of the packet traffic. It is recognized that the test may be divided into a number of factors. Continuing with the example set for above, the factors may be two, in which case the test may be factorized into a first portion referred to as a "trigger" and a second portion "confirmation" such that:

$$Sx=\text{trigger}+\text{confirmation}=\text{test}.$$

In this scenario, the trigger portion is recognized as requiring less processing resources and may be performed without significant delay in packet throughput, but with a lower degree of accuracy (i.e., a greater likelihood of false positives). The confirmation portion requires significant processing resources and operates to accurately identify the false positives. Thus, the signature Sx may be implemented through a pair of filtering operations, with the trigger portion comprising the criteria 18 for one trigger filter module 14(n) and the confirmation portion comprising the criteria 28 for one confirmation filter module 26(m). The trigger may further be recognized as being configurable as a function of several sub-factors v such that:

$$\text{trigger}=f(v),$$

wherein the sub-factors v may be any one or more of the following: test; the processing capabilities of the level (more specifically, the first level 12); other detection signatures; traffic; load, and the like. With respect to test, trigger could be a function of the sub-factor test in that the criteria 18 may be derived from the overall criteria of the test itself. With respect to processing capability, trigger could be a function of the sub-factor processing capability of the trigger filter module 14(n) in that selection of the criteria 18 is made such that it is readily implementable for efficient processing of the packet traffic with minimal throughput delay. With respect to other detection signatures, trigger could be a function of the subfactor of other threat or danger detection signatures by recognizing commonalities between the signatures and choosing a single criteria 18 more efficiently useful in identifying suspicious traffic with respect to plural threats or dangers. With respect to traffic and load, trigger could be a function of the sub-factor current traffic or load situation for the engine 10 such that different criteria 18 would be used depending on current traffic and load characteristics at each level.

By selectively choosing the one or ones of the modules 14(n) and 26(m), the generator module 100 exercises a level of dynamic control over the screening process implemented at each level. More specifically, with respect to a given detection signature, multiple modules 14(n) may be available for selection by the generator module 100 depending on any one or more factors (such as loading or traffic mix). Responsive to those factors, the generator module 100 switches among and between the modules 14(n) for purposes of triggering a suspicion of a threat or danger in the traffic 16 and generating the portion 22 for further evaluation in the second level 24. In making the switch, the generator module 100 may balance accuracy concerns against throughput concerns as well as evaluate relative loading on the various levels of the engine 10 to provide for an appropriate degree of sharing. Similarly, multiple modules 26(m) may be available for selection by the generator module 100. Which of those modules is selected may depend on which module(s) 14(n) are selected, as well as the same accuracy/throughput balancing and load sharing factors that influence the module 14(n) selection. As discussed above, appropriate hysteresis controls may be implemented to govern when changes in the selected modules 14(n) and 26(m) are made.

The consideration of sub-factors alone and in combination may be better understood through the examination of certain examples. For the sub-factors test and processing capabilities, assume that the test is for a tcp_port>=34000. It is recognized that filtering on a port greater than or equal to 34000 is a relatively complex operation. It is also recognized that filtering on a port greater than 32768 (which inherently tests for >=34000) is a much easier, and faster, processing operation since only a single binary bit in the port number needs to be examined to make the greater than or equal to determination. The trigger then becomes tcp_port>=32768 which is viewed as being a function of both the test (tcp_port>=34000) and perhaps the processing capabilities of the first filter level. Notably, the difference between 34000 and 32768 in the criteria 18 evaluated by the trigger filter 14 also causes the generation of a number of false positive catches that would have to be caught in the confirmation filter by accurately applying the test (tcp_port>=34000). However, some complexity is eliminated in the first level processing thus allowing for a faster throughput and transfer for the detailed screening operation to the second level where it may be performed only against the failing traffic portion 22.

Consider next the sub-factor for other detection signatures. In this scenario, the detection signature for a first test may comprise a certain string ABCD (long string compare), while the detection signature for a second test may comprise a certain string AEFG (also a long string compare) It is noted that the strings to be found by each of the tests shares string component A in common. Thus, a criteria 18 evaluated by the trigger filter 14 may be established to detect on the presence of string component A (i.e., a short string compare), with the benefit that this single trigger is used to relatively quickly detect the suspicion of the presence of the strings ABCD and AEFG. In this regard, the trigger then becomes a function of not only the individual tests, but more importantly a plurality of detection signatures. Again, it is worth noting that triggering on string component A may generate a number of false positive catches (from benign strings that also include A) that would have to be caught in the long string compare confirmation filter by accurately applying the tests for strings ABCD and AEFG.

Turning next to the sub-factor for traffic, the generator 100 monitors traffic load and type, and more particularly measures the effectiveness of the trigger filtering operation in predicting the presence of threatening or dangerous traffic, and dynamically adjusts the trigger to compensate. Returning again to the example above concerning the test (tcp_port>=34000) and the implemented trigger (tcp_port>=32768), the generator 100 may detect a substantial amount of benign traffic originating from port 33000 being inadvertently caught by the trigger. This is undesirable because it slows the throughput of this benign traffic and unnecessarily adds to the processing load carried by the second level. To address this concern, the trigger may be set as a function of the traffic load/type by adding to the trigger (tcp_port>=32768) an operation for detecting (tcp_port≠33000). This combination operation for the trigger filter criteria 18 adds slightly to the complexity of the first level operation while providing significant benefits in reducing second level load and improving the accuracy of the first level triggering operation.

With respect to the sub-factor for processor load, the generator 100 monitors load of the processing functions performed at each of the levels and dynamically adjusts the trigger as a function of load to compensate for overloads/underloads due to fluctuations in traffic and the accuracies of the screening processes performed at each level. For example, as discussed above, when the trigger allows excessive benign traffic to pass, load increases on the second level as it processes the suspicious traffic to detect the presence of threatening or dangerous traffic therein. This condition is detected by the generator 100 and an adjustment is made to increase the accuracy of the filtering operation performed at the first level. Similarly, when traffic is light, load on the first level decreases and the generator 100 may increase the accuracy of the first level filtering operation to increase its load and relieve the second level of some load. Conversely, when traffic is heavy, the first level processing load increases and the generator 100 may operate to decrease the accuracy of the first level processing to allow load decreases and a corresponding increase in throughput. Load balancing between the included filtering levels may thus be achieved.

Reference is now made to FIGS. 1–3. With respect to the filtering operations performed by the filters 14 and 26 at each of the levels in any of the embodiments, a number of processing functions may be considered and evaluated for purposes of use in, or in connection with, the filtering criteria. At OSI layer 1, the physical hardware interface for packet communication may be considered. At OSI layer 2, the following data link related coding, addressing and transmitting information may be considered: ethernet source/destination address, VLAN PRI/CFI, VLAN identifier and ethernet type, and MPLS labels. At OSI layer 3, the following network related transport route, message handling and transfer information may be considered: IP fields (for example, source/destination address, payload length, fragbits, header length, ID field, offset field, options, protocol field, type of service field, time-to-live field and version field), and ARP fields (sender and target MAC or protocol address, protocol or hardware type or size). Additionally, at OSI layer 4, the following transport related delivery service and quality information may be considered: TCP fields (source/destination port, data length, header length, acknowledgment number, flags, sequence number, urgent pointer, window and checksum), ICMP (type, code, sequence, ID, data length, checksum, icmp.code), and UDP (source/destination port). The processing functions may additionally evaluate protocol decode information as follows: HTTP (all header fields including request line, method, URI, protocol, host, content length, body), DNS, SMTP, SNMP, SMP, FTP, and the like. Still further, the processing functions may evaluate: fixed string-fixed offset, fixed string-variable offset, regular expression-fixed offset, regular expression-variable offset, collection of events, sequences of events, fragmentation, connection state, flow reassembly, normalization techniques (detect and eliminate overlapping fragments, evasion techniques), and hex and unicode decoding.

While automatic dynamic alteration has been discussed above, it will be recognized that the filtering alternations implemented in any of the disclosed embodiments may alternatively be selected and controlled by human intervention. In this way, the filtering criteria are user defined to tailor operation to the desires of the human manager, rather than operate under automatic control responsive to measured factors. It is also possible for the automatic operation to select a number of options for altering the filtering criteria, with those options presented to the human manager for consideration and selection.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A packet filtering device, comprising:
a first filter applying a first filtering criteria against packet traffic to generate a first pass traffic portion and a fail traffic portion; and
a second filter, by-passed by the first pass traffic portion, applying a second filtering criteria against the fail traffic portion to generate a second pass traffic portion and a reject traffic portion;
wherein the first and second filtering criteria are dynamically selected during first and second filter operation to filter packet traffic.

2. The device as in claim 1 wherein the first and second pass traffic portions combined comprise a pass filtered packet traffic output for destination delivery and the reject traffic portion comprises a reject filtered packet traffic output that is not destination delivered.

3. The device as in claim 1 wherein the first filtering criteria are designed to detect suspicious packet traffic for output as the fail traffic portion and the second filtering criteria are designed to detect threatening packet traffic within the suspicious packet traffic for output as the reject traffic portion.

4. The device as in claim 1 wherein the first filtering criteria are designed to trigger a suspicion of dangerous packets within the packet traffic and produce suspicious packets as the fail traffic portion and the second filtering criteria are designed to confirm the presence of dangerous packet traffic within the fail traffic portion and produce dangerous packets as the reject traffic portion.

5. The device as in claim 1 wherein the first and second filtering criteria are user selected.

6. A packet filtering device, comprising:
a first filter applying a first filtering criteria against packet traffic to generate a first pass traffic portion, a fail traffic portion and a first reject traffic portion; and
a second filter, by-passed by the first pass traffic portion and the first reject traffic portion, applying a second filtering criteria against the fail traffic portion to generate a second pass traffic portion and a second reject traffic portion.

7. The device as in claim 6 wherein the first and second pass traffic portions combined comprise a pass filtered packet traffic output for destination delivery and the first and second reject traffic portions combined comprise a reject filtered packet traffic output that is not destination delivered.

8. The device as in claim 7 wherein the first filtering criteria are designed to detect suspicious packet traffic for output as the fail traffic portion and dangerous packet traffic for output as the first reject portion, and wherein the second filtering criteria are designed to detect threatening packet traffic within the suspicious packet traffic for output as the second reject traffic portion.

9. The device as in claim 7 wherein the first filtering criteria are designed to trigger a suspicion of dangerous packets within the packet traffic and produce suspicious packets as the fail traffic portion and the second filtering criteria are designed to confirm the presence of dangerous packet traffic within the fail traffic portion and produce dangerous packets as the second reject traffic portion.

10. The device as in claim 9 wherein the first filtering criteria are further designed to trigger detection of dangerous packets within the packet traffic and produce dangerous packets as the first reject traffic portion.

11. The device as in claim 6 wherein the first and second filtering criteria are user selected.

12. The device as in claim 6 wherein the first and second filtering criteria are dynamically selected during first and second filter operation to filter packet traffic.

13. A packet filtering device, comprising:
a first filter applying a first filtering criteria against packet traffic to generate a first pass traffic portion and a fail traffic portion;
a second filter applying a second filtering criteria against the fail traffic portion to generate a second pass traffic portion and a reject traffic portion; and
a load detector operable to dynamically select the first and second filtering criteria during first and second filter operation on the packet traffic based on measured load.

14. The device as in claim 13 wherein the load detector includes a traffic monitor operating to measure packet traffic load, the load detector dynamically selecting the first and second filtering criteria based on measured packet traffic load.

15. The device as in claim 14 wherein the measured packet traffic load comprises packet traffic volume.

16. The device as in claim 15 wherein the packet traffic volume comprises a volume of a certain type of packet traffic.

17. The device as in claim 15 wherein the packet traffic volume comprises a volume of packet traffic from a certain origination.

18. The device as in claim 14 further including a load hysteresis evaluated by the load detector and which must be overcome by changes in the measured packet traffic load before a change is made in the first and second filtering criteria.

19. The device as in claim 13 wherein the load detector includes a filter load monitor operating to measure loading of the first and second filters, the load detector dynamically selecting the first and second filtering criteria based on measured load at each of the first and second filters.

20. The device as in claim 19 wherein the measured filter load comprises an identification of dropped packets by one of the first and second filters.

21. The device as in claim 19 wherein the measured filter load comprises an identification of a percentage of filter load capacity for one of the first and second filters.

22. The device as in claim 13 wherein the load detector operates to detect an imbalance in load between the first and second filters, the load detector changing the first and second filtering criteria to better balance load between the first and second filters.

23. The device as in claim 22 wherein the imbalance is indicated by an increased number of false positive packets contained in the fail traffic portion.

24. The device as in claim 13 wherein the application of the first filtering criteria against the packet traffic further generates an additional reject traffic portion such that each of the first pass traffic portion and the additional reject traffic portion by-passes filtering in the second filter.

25. The device as in claim 24 wherein the first and second pass traffic portions combined comprise a pass filtered packet traffic output for destination delivery and the reject traffic portion and additional reject traffic portion combined comprise a reject filtered packet traffic output that is not destination delivered.

26. The device as in claim 13 wherein the first filtering criteria are designed to detect suspicious packet traffic for output as the fail traffic portion, and wherein the second filtering criteria are designed to detect threatening packet traffic within the suspicious packet traffic for output as the reject traffic portion.

27. The device as in claim 13 wherein the first filtering criteria are designed to trigger a suspicion of dangerous packets within the packet traffic and produce suspicious packets as the fail traffic portion and the second filtering criteria are designed to confirm the presence of dangerous packet traffic within the fail traffic portion and produce dangerous packets as the reject traffic portion.

28. The device as in claim 27 wherein the first filtering criteria are further designed to trigger detection of dangerous packets within the packet traffic and produce dangerous packets as an additional reject traffic portion.

29. The device as in claim 13 wherein the dynamic selection of the first and second filtering criteria is made with user input.

30. A packet filtering device, comprising:
a first filter applying higher throughput, lower accuracy filtering criteria against packet traffic to generate a first pass traffic portion and a suspicious traffic portion; and
a second filter, by-passed by the first pass traffic portion, applying a lower throughput, higher accuracy filtering criteria against the suspicious traffic portion to generate a second pass traffic portion and a reject traffic portion;
wherein the first and second filtering criteria are dynamically selected during first and second filter operation to filter packet traffic.

31. A packet filtering device, comprising:
a first filter applying higher throughput, lower accuracy filtering criteria against packet traffic to generate a first pass traffic portion and a suspicious traffic portion; and
a second filter, by-passed by the first pass traffic portion, applying a lower throughput, higher accuracy filtering criteria against the suspicious traffic portion to generate a second pass traffic portion and a reject traffic portion; and
a load balancer operable to adjust the relative throughputs and accuracies of the first and second filtering criteria to balance load therebetween.

32. The device as in claim 31 wherein the load balancer makes the adjustment dynamically in response to measured load.

33. The device as in claim 32 wherein the measured load is first and second filter processing load.

34. The device as in claim 33 wherein the processing load is evaluated in comparison to first and second filter load capacity.

35. The device as in claim 32 wherein the measured load comprises packet traffic volume.

36. The device as in claim 35 wherein the packet traffic volume comprises a volume of a certain type of packet traffic.

37. The device as in claim 35 wherein the packet traffic volume comprises a volume of packet traffic from a certain origination.

38. The device as in claim 30 further including a functionality operable to adjust a complexity of the filtering criteria applied by the first and second filters to alter the relative throughputs and accuracies.

39. A packet filtering device, comprising:
a first filter applying higher throughput, lower accuracy filtering criteria against packet traffic to generate a first pass traffic portion and a suspicious traffic portion; and
a second filter, by-passed by the first pass traffic portion, applying a lower throughput, higher accuracy filtering criteria against the suspicious traffic portion to generate a second pass traffic portion and a reject traffic portion; and
a functionality operable to adjust a complexity of the filtering criteria applied by the first and second filters to alter the relative throughputs and accuracies so as to better balance load between the first and second filters.

40. The device as in claim 30 further including a functionality operable to adjust a comprehensiveness of the filtering criteria applied by the first and second filters to alter the relative throughputs and accuracies.

41. A packet filtering device, comprising:
a first filter applying higher throughput, lower accuracy filtering criteria against packet traffic to generate a first pass traffic portion and a suspicious traffic portion and
a second filter, by-passed by the first pass traffic portion, applying a lower throughput, higher accuracy filtering criteria against the suspicious traffic portion to generate a second pass traffic portion and a reject traffic portion; and
a functionality operable to adjust a comprehensiveness of the filtering criteria applied by the first and second filters to alter the relative throughputs and accuracies so to better balance load between the first and second filters.

42. The device as in claim 30 wherein the higher throughput, lower accuracy filtering criteria comprises a header field compare and the lower throughput, higher accuracy filtering criteria comprises a protocol decoder.

43. The device as in claim 30 wherein the higher throughput, lower accuracy filtering criteria comprises a trigger content search and the lower throughput, higher accuracy filtering criteria comprises a regular expression matching.

44. The device as in claim 43 wherein the trigger content search comprises a short string compare and the regular expression matching comprises a long string compare.

45. A method for hierarchical filtering of packet traffic, comprising the steps of:
first filtering the packet traffic with a first filtering criteria to generate a first pass traffic portion and a fail traffic portion;
second filtering the fail traffic portion, but not the first pass traffic portion, with a second filtering criteria to generate a second pass traffic portion and a reject traffic portion; and
dynamically selecting the first and second filtering criteria during first and second filtering to filter packet traffic.

46. The method as in claim 45 wherein the step of first filtering detects suspicious packet traffic for output as the fail traffic portion and the step of second filtering detects threatening packet traffic within the suspicious packet traffic for output as the reject traffic portion.

47. The method as in claim 45 wherein the step of first filtering triggers a suspicion of dangerous packets within the packet traffic and produces suspicious packets as the fail traffic portion and the step of second filtering criteria confirms the presence of dangerous packet traffic within the fail traffic portion and produces dangerous packets as the reject traffic portion.

48. The method as in claim 45 wherein the step of first filtering includes the step of applying the first filtering criteria against the packet traffic to further generate an additional reject traffic portion that by-passes processing by the step of second filtering.

49. The method as in claim 45 further including the steps of:
   measuring load; and
   dynamically selecting the first and second filtering criteria based on measured load.

50. The method as in claim 49 wherein the step of measuring load comprises the step of monitoring packet traffic load with the dynamic selection based on measured packet traffic load.

51. The method as in claim 49 further including the step of applying a load hysteresis which must be overcome by changes in the measured load before a change is made in the first and second filtering criteria.

52. The method as in claim 49 wherein the step of measuring load comprises the step of monitoring loading due to performance of the first and second filtering steps with the dynamic selection based on measured filtering step load.

53. The method as in claim 49 wherein the step of measuring load comprises the step of detecting an imbalance in load between performance of the first and second filtering steps with the dynamic selection made to better balance filtering step load.

54. The method as in claim 45 wherein:
   the step of first filtering includes the step of applying higher throughput, lower accuracy filtering criteria against the packet traffic; and
   the step of second filtering includes the step of applying lower throughput, higher accuracy filtering criteria against the fail traffic portion.

55. A method for hierarchical filtering of packet traffic, comprising the steps of:
   first filtering the packet traffic with a first filtering criteria to generate a first pass traffic portion and a fail traffic portion;
   second filtering the fail traffic portion, but not the first pass traffic portion, with a second filtering criteria to generate a second pass traffic portion and a reject traffic portion
   wherein:
      the step of first filtering includes the step of applying higher throughput, lower accuracy filtering criteria against the packet traffic and
      the step of second filtering includes the step of applying lower throughput, higher accuracy filtering criteria against the fail traffic portion and
      further including the step of balancing load between the first and second filtering steps by adjusting the relative throughputs and accuracies of the first and second filtering criteria.

56. The method as in claim 55 wherein the step of adjusting to balance load is made dynamically in response to measured load.

57. The method as in claim 54 further including the step of adjusting a complexity of the first and second filtering criteria to alter the relative throughputs and accuracies.

58. The method as in claim 54 further including the step of adjusting a comprehensiveness of the first and second filtering criteria to alter the relative throughputs and accuracies.

59. The method as in claim 54 wherein the higher throughput, lower accuracy filtering criteria comprises a header field compare and the lower throughput, higher accuracy filtering criteria comprises a protocol decoder.

60. The method as in claim 54 wherein the higher throughput, lower accuracy filtering criteria comprises a trigger content search and the lower throughput, higher accuracy filtering criteria comprises a regular expression matching.

61. The method as in claim 60 wherein the trigger content search comprises a short string compare and the regular expression matching comprises a long string compare.

62. The method as in claim 45 further including the step of user selecting the first and second filtering criteria.

63. A packet filtering device, comprising:
   a first filter applying a first filtering criteria against packet traffic to generate a first pass traffic portion and a fail traffic portion;
   a second filter applying a second filtering criteria against the fail traffic portion to generate a second pass traffic portion and a reject traffic portion;
   a load detector operable to detect an imbalance in load between the first and second filters and dynamically change the first and second filtering criteria during operation of the first and second filters in filtering packet traffic based on measured load to better balance load between the first and second filters.

64. The device as in claim 63 wherein the imbalance is indicated by an increased number of false positive packets contained in the fail traffic portion.

65. A packet filtering device, comprising:
   a first filter applying higher throughput, lower accuracy filtering criteria against packet traffic to generate a first pass traffic portion and a suspicious traffic portion;
   a second filter applying a lower throughput, higher accuracy filtering criteria against the suspicious traffic portion to generate a second pass traffic portion and a reject traffic portion; and
   a functionality operable to adjust a complexity of the filtering criteria applied by the first and second filters to alter the relative throughputs and accuracies, wherein the functionality makes the complexity adjustments to better balance load between the first and second filters.

66. A packet filtering device, comprising:
   a first filter applying higher throughput, lower accuracy filtering criteria against packet traffic to generate a first pass traffic portion and a suspicious traffic portion;
   a second filter applying a lower throughput, higher accuracy filtering criteria against the suspicious traffic portion to generate a second pass traffic portion and a reject traffic portion; and
   a functionality operable to adjust a comprehensiveness of the filtering criteria applied by the first and second filters to alter the relative throughputs and accuracies, wherein the functionality makes the comprehensiveness adjustments to better balance load between the first and second filters.

67. A packet filtering device, comprising:
   a first filter including a first plurality of filter modules, each filter module having associated first filtering criteria;

a second filter including a second plurality of filter modules, each filter module having associated second filtering criteria; and a generator module operating to select at least one of the first plurality of filter modules and at least one of the second plurality of filter modules;

the associated first filtering criteria of the selected first plurality of filter modules being applied against packet traffic to generate a first pass traffic portion and a fail traffic portion; and the associated second filtering criteria of the selected second plurality of filter modules being applied against the fail traffic portion to generate a second pass traffic portion and a reject traffic portion; and wherein the generator module operates to dynamically select the first and second plurality of filtering modules during first and second filter operation in filtering packet traffic based on measured load at each filter so as to balance load between the first and second filters.

68. A packet filtering device, comprising:

a first filter applying a first filtering criteria against packet traffic to generate a first pass traffic portion and a fail traffic portion; and a second filter applying a second filtering criteria against the fail traffic portion to generate a second pass traffic portion and a reject traffic portion;

wherein the first and second filtering criteria are dynamically selected during operation of the first and second filters in filtering packet traffic.

69. The device as in claim 68 wherein the first and second pass traffic portions combined comprise a pass filtered packet traffic output for delivery and the reject traffic portion comprises a reject filtered packet traffic output that is not delivered.

70. A packet filtering device, comprising:

a first filter applying a first filtering criteria against packet traffic to generate a first pass traffic portion, a fail traffic portion and a first reject traffic portion; and a second filter applying a second filtering criteria against the fail traffic portion to generate a second pass traffic portion and a second reject traffic portion;

wherein the first and second filtering criteria are dynamically selected during operation of the first and second filters in filtering packet traffic.

71. The device as in claim 70 wherein the first and second pass traffic portions combined comprise a pass filtered packet traffic output for delivery and the first and second reject traffic portions combined comprise a reject filtered packet traffic output that is not delivered.

72. A method for hierarchical filtering of packet traffic, comprising the steps of:

first filtering the packet traffic with a first filtering criteria to generate a first pass traffic portion and a fail traffic portion; and second filtering the fail traffic portion with a second filtering criteria to generate a second pass traffic portion and a reject traffic portion;

wherein the first and second filtering criteria are dynamically selected during implementation of the steps of first and second filtering of the packet traffic.

73. The method as in claim 72 further comprising:

delivering the first and second pass traffic portions as pass filtered packet traffic; and not delivering the reject traffic portion as reject filtered packet traffic.

74. The device of claim 13 wherein the generated first pass traffic portion by-passes the second filter.

75. The method as in claim 45 further comprising:

combining the first and second pass traffic portions as a pass filtered packet traffic output for destination delivery; and combining the reject traffic portion and additional reject traffic portion as a reject filtered packet traffic output that is not destination delivered.

* * * * *